United States Patent Office 3,453,329
Patented July 1, 1969

3,453,329
N-POLYCYCLIC HYDROCARBYL SUBSTITUTED PHENYLENEDIAMINES
Elmar R. Altwicker, Somerville, N.J., assignor to Universal Oil Products Company, Des Plaines, Ill., a corporation of Delaware
No Drawing. Filed Aug. 4, 1966, Ser. No. 570,167
Int. Cl. C07c 87/64
U.S. Cl. 260—576    8 Claims

ABSTRACT OF THE DISCLOSURE

N-polycyclic hydrocarbyl substituted phenylenediamines and N,N'-di-polycyclic hydrocarbyl substituted phenylenediamines in which the polycyclic hydrocarbyl radical(s) is selected from the group consisting of octahydro-4,7-methanoindenyl, norbornyl, methylated norbornyl, bicyclo-(2.2.2)-octanyl, and methylated bicyclo-(2.2.2)-octanyl. The compounds are useful as stabilizing additives for rubbery polymers, gasoline, lube oil and other compositions normally subject to deterioration by oxygen or ozone.

---

This invention relates to a new class of compounds and to compositions containing such compounds which are stabilized against deterioration resulting from the action of ozone or oxygen. More particularly, this invention relates to a novel class of phenylenediamine derivatives.

The novel compounds of this invention have the following general structural formula:

$$R_1-\overset{H}{\underset{|}{N}}-\text{C}_6\text{H}_4-\overset{H}{\underset{|}{N}}-R_2 \quad (I)$$

where $R_1$ is selected from the group consisting of $R_2$, hydrogen, alkyl, cycloalkyl and aryl and $R_2$ is a polycyclic radical selected from the formulae:

$$(X-\overset{|}{\underset{|}{C}}-X)_n \text{ and } \text{[bicyclic structure]}$$

where X is selected from hydrogen and methyl and $n$ is an integer of 1 to 2.

The novel phenylenediamine derivatives represented by the above Formula I find wide utility in the chemical field and are especially useful as plasticizers, ingredients of synthetic waxes and resins, precursors for pharmaceuticals and insecticides, or as antiozonants and antioxidants. Of these many uses, however, one of the more valuable present uses for these compounds is the stabilization of compositions against the deteriorating effects of oxygen or ozone. Of considerable significance in this regard is that certain of these compounds, and particularly the compounds where both $R_1$ and $R_2$ of the above Formula I are polycyclic radicals, are highly effective in the stabilization of rubbery polymers against ozone or oxygen attack.

The compounds of this invention are prepared, in general, according to the process of this invention by reductively alkylating a nitro or amino substituted phenylamine of the formula:

$$R_1-\overset{H}{\underset{|}{N}}-\text{C}_6\text{H}_4-Y \quad (II)$$

with a polycyclic ketone selected from the formulae consisting of:

$$(X-\overset{|}{\underset{|}{C}}-X)_n =O \quad \text{and} \quad \text{[bicyclic ketone]}=O$$

(III)    (IV)

where $R_1$, X and $n$ have the same meaning as represented for Formula I above and Y comprises an amino or a nitro group. Examples of the nitro or amino substituted phenylamines which may be used in the preparational reaction include: where $R_1$ is hydrogen or an alkyl group and preferably alkyl of from 1 to about 20 carbon atoms, such phenylamines as p-nitrophenylamine,
o-aminophenylamine,
N-nonyl-p-aminophenylamine,
N-octyl-p-aminophenylamine,
N-butyl-p-aminophenylamine,
N-dodecyl-o-aminophenylamine,
N-pentadecyl-o-aminophenylamine,
N-octadecyl-p-aminophenylamine,
N-isobutyl-o-aminophenylamine or
N-eicosyl-p-aminophenylamine;

where $R_1$ is cycloalkyl and preferably cycloalkyl of from 5 to about 7 carbon atoms such phenylamines as N-cyclopentyl-p-nitrophenylamine,
N-cyclopentyl-p-aminophenylamine,
N-cyclohexyl-p-aminophenylamine,
N-cyclohexyl-o-aminophenylamine,
N-cycloheptyl-p-aminophenylamine or
N-cycloheptyl-o-aminophenylamine;

where $R_1$ is aryl, and preferably phenyl or naphthyl, such phenylamines as

N-phenyl-p-aminophenylamine,
N-(1-naphthyl)-p-aminophenylamine,
N-phenyl-o-aminophenylamine or
N-(2-naphthyl)-o-aminophenylamine;

or where $R_1$ is a polycyclic radical such amines as

N-(octahydro-4,7-methanoinden-5-yl)-p-aminophenylamine,
N-(octahydro-4,7-methanoinden-5-yl)-o-aminophenylamine,
N-(norborn-1-yl)-p-aminophenylamine,
N-(norborn-1-yl)-o-aminophenylamine,
N-(6,7,7-trimethyl-norborn-1-yl)-p-aminophenylamine,
N-(4,4,5,6-tetramethyl-norborn-1-yl)-p-aminophenylamine,
N-(bicyclo-(2.2.2)-oct-1-yl)-p-aminophenylamine or
N-(bicyclo-(2.2.2)-4,5-dimethyloct-1-yl)-o-aminophenylamine.

The last group of phenylamines illustrated above, aside from representing phenylamine reactants which may be used in the reductive alkylation to prepare N,N'-dipolycyclic substituted phenylenediamines, also illustrate the compounds of this invention where $R_1$ in Formula I above is hydrogen. These compounds may be prepared in the process by using as the phenylamine reactant, a phenylamine having Formula II above where $R_1$ is hydrogen. As an alternative to the above indicated procedure for preparing the N,N'-dipolycyclic substituted phenylenediamines, instead of using a phenylamine reactant having Formula II where $R_1$ is a polycyclic radical, the phenylamine reactant may have $R_1$ as hydrogen and a sufficient molar excess of the desired polycyclic ketone used in the reaction to form the desired N,N'-dipolycyclic substituted compounds.

The above illustrated specific phenylamines represent only a few of the many phenylamines having the above Formula II which may be used to prepare the compounds of this invention. It should also be understood, of course, that the phenylamines may be substituted on the phenyl ring or on the $R_1$ group, when such is not hydrogen, with such groups as alkyl, halo, or alkoxy, examples of which include N-sec-octyl-o-chloro-p-aminophenylamine or N-phenyl-o-methoxy-p-aminophenylamine. Examples of the polycyclic ketones having the above Formulae III or IV which may be reacted with the above illustrated phenylamines having the formula II above to form the compounds of this invention include:

octahydro-4,7-methano-5-indenone,
bicyclo-(2.2.1)-heptanone,
bicyclo-(2.2.1.)-6,7,7-trimethylheptan-1-one,
bicyclo-(2.2.1)-4,4,5-trimethylheptan-1-one,
bicyclo-(2.2.1)-4,4,5,6-tetramethylheptan-1-one,
bicyclo-(2.2.2)-octanone,
bicyclo-(2.2.2)-7,7-dimethyloctan-1-one or
bicyclo-(2.2.2)-7,7,8,8-tetramethyloctan-1-one.

In effecting the reductive alkylation reaction of the phenylamine represented by Formula II above with the polycyclic ketones represented by Formulae III or IV above, the condition and procedures used may be widely varied. Generally, the conditions and procedures commonly employed in reduction alkylations of nitro or amino substituted phenylamines with ketones to prepare N substituted phenylenediamines may be satisfactorily used for the preparation of the compounds of this invention. Typically the reaction is effected in the presence of hydrogen and reduction catalysts. Suitable catalysts for this purpose include such catalysts as Raney nickel, palladium, platinum, platinum oxide, nickel-platinum or molybdenum as well as mixtures thereof. Such catalysts may be used with or without a support and such supports include such materials as charcoal, alumina, silica or mixtures thereof. An elevated temperature is used which generally ranges from about 90° to 300° C. using elevated hydrogen pressure ranging from about 50 to 3000 pounds per square inch.

Examples of the compounds of this invention, in addition to those illustrated above, where $R_1$ of Formula I is hydrogen, which may be prepared in the reductive alkylation reaction include N-nonyl-N'-(octahydro-4,7-methanoinden-5-yl)-p-phenylenediamine,
N-octyl-N'-octahydro-4,7-methanoinden-5-yl)-o-phenylenediamine,
N-dodecyl-N'-(norborn-1-yl)-p-phenylenediamine,
N-pentadecyl-N'-(6,7,7-trimethylnorborn-1-yl)-p-phenylenediamine,
N-cyclopentyl-N'-(octahydro-4,7-methanoinden-5-yl)-p-phenylenediamine,
N-cyclohexyl-N'-(octahydro-4,7-methanoinden-5-yl)-p-phenylenediamine,
N-cycloheptyl-N'-(norborn-1-yl)-p-phenylenediamine,
N-cyclopentyl-N'-(6,7,,7-trimethylnorborn-1-yl)-p-phenylenediamine,
N-(1-naphthyl)-N'-(octahydro-4,7-methanoinden-5-yl)-p-phenylenediamine,
N-phenyl-N'-(octahydro-4,7-methanoinden-5-yl)-p-phenylenediamine,
N-(2-naphthyl)-N'-(norborn-1-yl)-p-phenylenediamine,
N-phenyl-N'-(6,7,7-trimethylnorborn-5-yl)-p-phenylenediamine,
N-(octahydro-4,7-methanoinden-5-yl)-N'-(norborn-1-yl)-p-phenylenediamine,
N-(octahydro-4,7-methanoinden-5-yl)-N'-(6,7,7-trimethylnorborn-1-yl)-p-phenylenediamine,
N,N'-di-(octahydro-4,7-methanoinden-5-yl)-p-phenylenediamine,
N,N'-di-(norborn-1-yl)-p-phenylenediamine, or
N,N'-di-(6,7,7-trimethyl-norborn-1-yl)-p-phenylenediamine.

As hereinbefore indicated, the novel compounds of this invention are particularly useful in stabilizing compositions against the deteriorating effects of oxygen or ozone. The compositions which may be stabilized according to this invention by incorporation of the compounds of this invention therein, in general, comprise any material which is deleteriously affected by the action of either ozone or oxygen. Examples of these compositions include petroleum products, for example, unsaturated gasolines or lubricating oils; edible fats and oils; for example, linseed oil or lard; polyolefins, for example, polyethylene or polypropylene, olefin copolymers, for example, ethylene and propylene; rubbery polymers including both natural rubber and synthetic rubbers, for example, homopolymers or copolymers of butadiene, isoprene, and similar aliphatic conjugated diolefin hydrocarbons, such as butadiene-styrene copolymer rubber, butadiene-acrylonitrile copolymer rubber, butadiene-vinylpyridine copolymer rubber, isobutylene-isoprene copolymer rubber, ethylene-propylene-conjugated diolefin or non-conjugated diolefin terpolymer or polychloroprene.

The compounds of this invention may be added to the above illustrated class of compositions, either individually or in admixture, according to any of the standard procedures commonly used for incorporating antiozonants or antioxidants into polymeric materials. These compositions may also, if desired, contain additional conventional antioxidants or antiozonants which, in combination with the compounds of this invention, may result in the formation of synergistic compositions. The amount of the compounds of this invention added to stabilize the compositions may be widely varied with the particular amount added being dependent upon such factors as the particular composition being stabilized, the particular stabilizing compound or compounds being added and whether the composition is being stabilized against oxidation or ozonolysis or both. For example, in the instance where rubbery polymers are being stabilized, the amount of the compound added usually ranges from about 0.05 to 10 weight parts per 100 weight parts of the rubbery polymer, with from about 0.1 to 5 weight parts per 100 weight parts usually being preferred.

The following examples are cited to illustrate the novel compounds of this invention, the preparational process therefore and the stabilized compositions containing such compounds. They are not, however, intended to limit the broad scope of this invention to the specific compounds and compositions illustrated therein.

EXAMPLE I

N - phenyl - N'-(octahydro-4,7-methanoinden-5-yl)-p-phenylenediamine was prepared by the process of this invention according to the following procedure:

About 10 grams (0.067 mol) of octahydro-4,7-methanoinden-5-one, 11.5 grams (0.0625 mol) of p-aminodiphenylamine, 2 grams of a platinum-alumina catalyst containing 0.5 weight percent of platinum, and 100 milliliters of xylene were charged to an autoclave. The autoclave was pressured to 800 pounds per square inch with hydrogen and heated to 168° C. The reaction was continued until the desired quantity of hydrogen had been adsorbed, a period requiring about 5 hours. The autoclave was cooled and the contents removed, filtered to separate the catalyst, and then distilled on a steam bath to remove the xylene. On cooling, product crystals formed which were recrystallized from methanol to recover 11.5 grams of a light grey solid having a melting point of 129° to 131.5° C. Infrared analysis of the product indicated the correct structure.

EXAMPLE II

N,N' - di-(octahydro-4,7-methanoinden-5-yl)-p-phenylenediamine was prepared according to the general procedure of Example I by reacting N-(octahydro-4,7-methanoinden-5-yl)-p-aminophenylamine with octahydro-4,7-methanoinden-5-one. The very pale pink-colored product obtained had a melting point of 191° to 194° C. Analysis by infrared spectroscopy, gas-liquid chromatography and elemental analysis indicated the correct structure.

EXAMPLE III

N-phenyl, N'-(norborn-1-yl)-p-phenylenediamine was prepared according to the general procedure of Example I by reacting N-phenyl-p-aminophenylamine with bicyclo-(2.2.1)-cycloheptanone. The purple-colored product obtained had a melting point of 108° to 110° C. Analysis by infrared spectroscopy and gas-liquid chromatography indicated the correct structure.

EXAMPLE IV

N,N'-di-(norborn-1-yl)-p-phenylenediamine was prepared according to the general procedure of Example I by reacting p-aminophenylamine with bicyclo-(2.2.1) heptanone. The pink-colored product obtained had a melting point of 144° to 150° C. Analysis by infrared spectroscopy and gas-liquid chromatography indicated the correct structure.

EXAMPLE V

N - (n-butyl)-N'-(octahydro-4,7-methanoinden-5-yl)-p-phenylenediamine was prepared according to the general procedure of Example I by reacting N-(n-butyl)-p-aminophenylamine with octahydro-4,7-methanoinden-5-one. A pale yellow-colored product was obtained having a boiling point of 220° to 230° C./1 mm. Hg. This procedure was repeated using N-n(secbutyl)-p-aminophenylamine to prepare N-(secbutyl)-N'(octahydro-4,7-methanoinden-5-yl)-p-phenylenediamine having a boiling point of 220° to 230° C./1 mm. Hg.

EXAMPLE VI

Certain compounds of this invention were evaluated as antiozonants as follows:
An SBR sidewall stock rubber of the recipe:

| Ingredient: | Parts by weight |
|---|---|
| SBR 1502 | 100.00 |
| Furnex | 10.00 |
| Statex M | 30.00 |
| Zinc oxide | 3.00 |
| Stearic acid | 2.00 |
| Sulfur | 2.00 |
| Santocure | 1.25 |
| Antiozonant additive | As indicated | was cured for 40 minutes at 140° C. and then cut into test strips of 1 inch by 4 inches. Different series of the test strips were then elongated 10%, 15%, 20% and 30%, respectively, and the elongated strips were mounted on panels. The panels were placed in an ozone cabinet and subjected to an atmosphere containing 50 parts of ozone per 100 million parts of air at 100° F. and the time to first crack is noted. The results of these evaluations, as compared to the results obtained for a control sample of the same rubber containing no antiozonant additive, are reported in the following Table I. The code used for the antiozonants reported in Table I, and the amount of the antiozonant compounds used in the rubber samples, and the amount used in combination with a standard antiozonant are as follows:

| Sample code | Antiozonant | Concentration per 100 parts of rubber |
|---|---|---|
| 1 | Blank, no antiozonant | |
| 2 | N,N'-di-(1-methylheptyl)-p-phenylenediamine (standard antiozonant). | 1.5 |
| 3 | N-phenyl-N'-(octahydro-4,7-methano-inden-5-yl)-p-phenylenediamine. | 3.00 |
| 4 | N-phenyl-N'-(octahydro-4,7-methano-inden-5-yl)-p-phenylenediamine. | 1.5 |
| | Standard antiozonant as above | 1.5 |
| 5 | N,N'-di-(norborn-1-yl)p-phenylene-diamine | 3.00 |
| 6 | N,N'-di-(norborn-1-yl)-p-phenylene-diamine | 1.5 |
| | Standard antiozonant as above | 1.5 |
| 7 | N-phenyl-N'-(norborn-1-yl)-p-phenylene-diamine. | 3.00 |
| 8 | N-phenyl-N'-(norborn-1-yl)-p-phenylene-diamine. | 1.5 |
| | Standard antiozonant as above | 1.5 |

TABLE I

| Sample | Hours to first crack, elongation | | | |
|---|---|---|---|---|
| | 10% | 15% | 20% | 30% |
| 1 | 0-1 | 0-1 | 0-1 | |
| 2 | >144 | 3-4 | 1-2 | 1-2 |
| 3 | 3-4 | 2-3 | 2-3 | |
| 4 | >144 | >144 | >144 | >144 |
| 5 | >168 | 1-2 | 1-2 | 0-1 |
| 6 | >168 | >168 | >168 | >168 |
| 7 | >168 | 3-4 | 2-3 | 0-1 |
| 8 | >168 | >168 | >168 | >168 |

From the data summarized in Table I above, it may be observed that certain of the compounds of this invention result in synergistic antiozonant compositions when combined with other antiozonants. Compare, for example, the data for samples 2 and 3 versus 4, 2 and 5 versus 6, and 2 and 7 versus 8, where the combination of different antiozonants achieves a greater result than the sum of the results obtained when the antiozonants are used separately.

EXAMPLE VII

Certain compounds of this invention were evaluated as antioxidants as follows:

Test A

N,N' - di(octahydro - 4,7 - methanoinden - 5 - yl) - p-phenylenediamine was added to a cracked gasoline in an amount of 0.002 percent by weight. The stabilized gasoline was then charged to an oxygen bomb and oxygen was charged until a pressure of 100 pounds per square inch was achieved. The bomb was sealed, heated to 100° C. and then the induction period for the sample was determined according to the ASTM procedure D525–55. The induction period for the stabilized gasoline sample was 412 minutes, and the induction period for an unstabilized gasoline sample was 195 minutes.

Test B

SBR–1500 rubber samples containing the following additives in the indicated amounts were subjected to oxidation studies as measured by infrared spectrophotometry according to the procedures described in High Temperature Infrared Cells for Studies of Solid High Polymer Reactions, W. A. Bishop, Analytical Chemistry 33, 456 (1961). The induction periods obtained for the samples as compared to a rubber sample containing a standard antioxidant are summarized in Table II below.

TABLE II

| Antioxidant | Concentration per 100 parts of rubber | Induction period (minutes) |
|---|---|---|
| N-phenyl-N'-alkyl-p-phenylenediamine (Standard antioxidant)[1] | 1.25 | 495 |
| N-phenyl-N'-(octahydro-4,7-methanoinden-5-yl)-p-phenylenediamine | 1.25 | 1104 |
| N,N'-di-(octahydro-4,7-methanoinden-5-yl)-p-phenylenediamine | 1.25 | 891 |

[1] Flexone 5L.

I claim as my invention:
1. A compound having the formula:

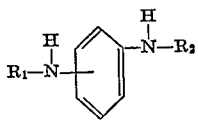

where $R_1$ is selected from the group consisting of $R_2$, hydrogen, alkyl, cycloalkyl, phenyl, and naphthyl, and $R_2$ is a polycyclic radical of the formula selected from

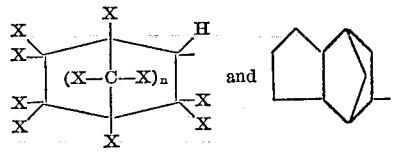

where X is selected from the group consisting of hydrogen and methyl and $n$ is an integer of 1 to 2.

2. The compound according to claim 1 where $R_1$ is an alkyl group of from 1 to about 20 carbon atoms.
3. The compound according to claim 1 where $R_1$ is a cycloalkyl group of from 5 to about 7 carbon atoms.
4. The compound according to claim 1 where $R_1$ is a phenyl group.
5. The compound according to claim 1 where $R_1$ is a polycyclic radical of the formula:

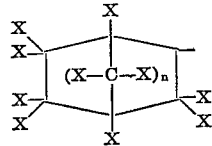

where X is selected from the group of hydrogen and methyl and $n$ is an integer of 1 to 2.

6. The compound according to claim 1 where $R_1$ is a polycyclic radical of the formula:

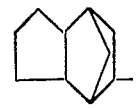

7. N - phenyl - N' - (octahydro-4,7-methanoindene-5-yl)-p-phenylenediamine.
8. The compound according to claim 1, characterized in that it is selected from the group consisting of N,N'-di-(octahydro - 4,7 - methanoinden - 5-yl)-p-phenylenediamine, N,N'-di(norborn-1-yl)-p-phenylenediamine, N-phenyl-N'-(norborn-1-yl)-p-phenylenediamine, and N-butyl - N' - (octahydro-4,7-methanoinden-5-yl)-p-phenylenediamine.

References Cited
UNITED STATES PATENTS 2,393,889   1/1946   Cook et al. _____ 260—576 X
3,278,602   10/1966   Peeler _____ 260—576

CHARLES B. PARKER, *Primary Examiner.*

CHARLES F. WARREN, *Assistant Examiner.*

U.S. Cl. X.R.

44—74; 252—401; 260—45.9, 398.5, 571, 801